(12) United States Patent
Ferguson et al.

(10) Patent No.: US 8,755,967 B1
(45) Date of Patent: Jun. 17, 2014

(54) ESTIMATING ROAD LANE GEOMETRY USING LANE MARKER OBSERVATIONS

(75) Inventors: David I. Ferguson, San Francisco, CA (US); Jiajun Zhu, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 166 days.

(21) Appl. No.: 13/427,959

(22) Filed: Mar. 23, 2012

(51) Int. Cl.
*G01C 21/26* (2006.01)
*G01S 17/89* (2006.01)

(52) U.S. Cl.
USPC ............. 701/28; 701/532; 382/104; 382/203; 180/167

(58) Field of Classification Search
None
See application file for complete search history.

(56) References Cited

U.S. PATENT DOCUMENTS

| | | | | |
|---|---|---|---|---|
| 6,489,887 | B2 * | 12/2002 | Satoh et al. | 340/436 |
| 6,868,168 | B2 * | 3/2005 | Tsuji | 382/104 |
| 8,340,896 | B2 | 12/2012 | Saito | |
| 8,520,071 | B2 * | 8/2013 | Suzuki | 348/148 |
| 2002/0131620 | A1 * | 9/2002 | Shirato | 382/104 |
| 2007/0183666 | A1 * | 8/2007 | Ding | 382/199 |
| 2010/0014713 | A1 | 1/2010 | Zhang et al. | |
| 2010/0121577 | A1 | 5/2010 | Zhang et al. | |
| 2010/0217529 | A1 | 8/2010 | Stroila et al. | |
| 2010/0253542 | A1 | 10/2010 | Seder et al. | |
| 2010/0299109 | A1 | 11/2010 | Saito | |
| 2011/0200258 | A1 * | 8/2011 | Suzuki et al. | 382/199 |

FOREIGN PATENT DOCUMENTS

| | | | |
|---|---|---|---|
| EP | 1320072 A2 | * | 6/2003 |
| JP | 2003-255047 | * | 9/2003 |
| JP | 2004139338 A | | 5/2004 |

OTHER PUBLICATIONS

International Search Report and Written Opinion for Application No. PCT/US2013/033315 dated Jan. 9, 2014.

* cited by examiner

*Primary Examiner* — Michael J Zanelli
(74) *Attorney, Agent, or Firm* — Lerner, David, Littenberg, Krumholz & Mentlik, LLP

(57) ABSTRACT

Aspects of the disclosure relate generally to detecting the edges of lane lines. Specifically, a vehicle driving on a roadway may use a laser to collect data for the roadway. A computer may process the data received from the laser in order to extract the points which potentially reside on two lane lines defining a lane. The extracted points are used by the computer to determine a model of a left lane edge and a right lane edge for the lane. The model may be used to estimate a centerline between the two lane lines. All or some of the model and centerline estimates, may be used to maneuver a vehicle in real time and also to update or generate map information used to maneuver vehicles.

21 Claims, 12 Drawing Sheets

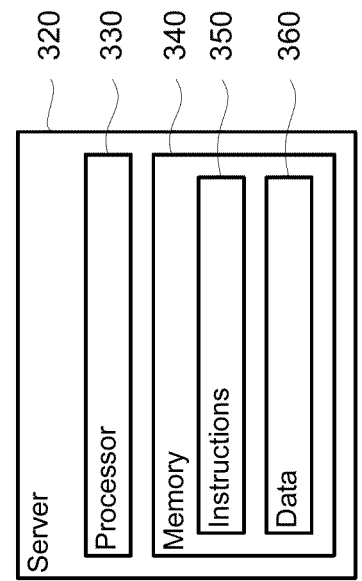
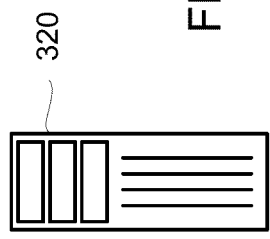
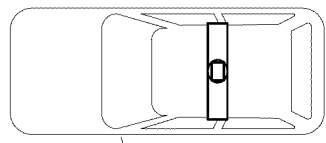
FIGURE 3B
FIGURE 3C

ESTIMATING ROAD LANE GEOMETRY USING LANE MARKER OBSERVATIONS

CROSS-REFERENCE TO RELATED APPLICATION(S)

This patent application is related to U.S. patent application Ser. No. 13/427,964 entitled "DETECTING LANE MARKINGS" filed concurrently herewith on Mar. 23, 2012, the entire disclosure of which is hereby incorporated by reference herein.

BACKGROUND

Autonomous vehicles use various computing systems to aid in the transport of passengers from one location to another. Some autonomous vehicles may require an initial input or continuous input from an operator, such as a pilot, driver, or passenger. Other autonomous systems, for example autopilot systems, may be used only when the system has been engaged, which permits the operator to switch from a manual mode (where the operator exercises a high degree of control over the movement of the vehicle) to an autonomous mode (where the vehicle essentially drives itself) to modes that lie somewhere in between.

Such vehicles are typically equipped with various types of sensors in order to detect objects in the surroundings. For example, autonomous vehicles may include lasers, sonar, radar, cameras, and other devices which scan and record data from the vehicle's surroundings. Sensor data from one or more of these devices may be used to detect objects and their respective characteristics (position, shape, heading, speed, etc.). This detection and identification is a critical function for the safe operation of autonomous vehicle.

In some autonomous driving systems, features such as lane markers are ignored by the autonomous driving system. When the lane markers are ignored, the autonomous vehicle may maneuver itself by relying more heavily on map information and geographic location estimates. This may be less useful in areas where the map information is unavailable, incomplete, or inaccurate.

Some non-real time systems, such as those systems which do not need to process the information and make driving decisions in real time, may use cameras to identify lane markers. For example, map makers may use camera images to identify lane lines. This may involve processing images in order to detect visual road markings such as painted lane boundaries in one or more camera images. However, the quality of camera images is dependent upon the lighting conditions when the image is captured. In addition, the camera images must be projected onto the ground or compared to other images in order to determine the geographic location of objects in the image.

BRIEF SUMMARY

One aspect of the disclosure provides a method. The method includes accessing sensor data collected for a roadway. The sensor data includes data points having location information for objects. The method also includes determining an initial estimate for a location of an edge of a lane marker bounding a lane; generating a set of possible estimates for the location of the edge based on an offset distance; for each estimate of the set of possible estimates, determining a likelihood value indicative of how likely the estimate is to be the location of the edge; and selecting a most likely estimate of the set of possible estimates based on the likelihood values. A processor fits the sensor data points to a model describing a location and shape of the edge. The method also includes determining a representation of the edge based on the model.

In one example, determining the initial estimate includes accessing detailed map information for the roadway, and the initial estimate is based on a location of an edge included in the detailed map information. In another example, determining the initial estimate is based on a previous representation of the location of the edge of the lane marker. In yet another example, generating the set of possible estimates for the location of the edge includes moving the initial estimate laterally from the initial estimate the offset distance a plurality of times. In a further example, the method includes using the representation of the edge to maneuver a vehicle autonomously. In one example, the method also includes receiving the sensor data from a laser device. In another example, the method also includes filtering the sensor data to identify data points within a pre-determined distance of the selected most likely estimate and the data points fit to the model describing the location and shape of the edge are the identified data points.

In another example, the method also includes determining an initial estimate for a location of a second edge of a second lane marker bounding the lane; generating a second set of possible estimates for the location of the second edge based on the offset distance; for each estimate of the second set of possible estimates, determining a second likelihood value indicative of how likely the estimate is to be the location of the second edge; selecting a second most likely estimate of the second set of possible estimates based on the likelihood values; filtering the sensor data to identify second data points within the pre-determined distance of the selected second most likely estimate; fitting the identified second data points to a second model describing a second location and shape of the second edge; and determining a second representation of the second edge based on the second model. In this example, the method may also include determining a centerline of the lane based on the representation and the second representation. The method may also include maneuvering a vehicle autonomously based on the representation and the second representation.

Another aspect of the disclosure provides a device. The device includes memory storing sensor data collected for a roadway. The sensor data includes data points having location information for objects. The device also includes a processor coupled to the memory. The processor is configured to determine an initial estimate for a location of an edge of a lane marker bounding a lane; generate a set of possible estimates for the location of the edge based on an offset distance; for each estimate of the set of possible estimates, determine a likelihood value indicative of how likely the estimate is to be the location of the edge; select a most likely estimate of the set of possible estimates based on the likelihood values; fit the sensor data points to a model describing a location and shape of the edge; and determine a representation of the edge based on the model.

In one example, the processor is configured to determine the initial estimate by accessing detailed map information for the roadway, and the initial estimate is based on a location of an edge included in the detailed map information. In another example, the processor is configured to determine the initial estimate based on a previous representation of the location of the edge of the lane marker. In yet another example, the processor is configured to generate the set of possible estimates for the location of the edge by moving the initial estimate laterally from the initial estimate the offset distance a plurality of times. In a further example, the processor is configured to use the representation of the edge to maneuver a vehicle autonomously. In another example, the processor is configured to receive the sensor data from a laser device. In yet another example, the processor is configured to filter the sensor data to identify data points within a pre-determined distance of the selected most likely estimate and the data points fit to the model describing the location and shape of the edge are the identified data points.

In another example, the processor is configured to determine an initial estimate for a location of a second edge of a second lane marker bounding the lane; generate a second set of possible estimates for the location of the second edge based on the offset distance; for each estimate of the second set of possible estimates, determine a second likelihood value indicative of how likely the estimate is to be the location of the second edge; select a second most likely estimate of the second set of possible estimates based on the likelihood values; filter the sensor data to identify second data points within the pre-determined distance of the selected second most likely estimate; fit the identified second data points to a second model describing a second location and shape of the second edge; and determine a second representation of the second edge based on the second model. In this example, the processor may also be configured to determine a centerline of the lane based on the representation and the second representation and to maneuver the vehicle along the centerline. The processor may also be configured to maneuver the vehicle autonomously based on the representation and the second representation.

A further aspect of the disclosure provides a tangible computer-readable storage medium on which computer readable instructions of a program are stored. The instructions, when executed by a processor, cause the processor to perform a method. The method includes accessing sensor data for a roadway, the sensor data includes data points having location information for objects; determining an initial estimate for a location of an edge of a lane marker bounding a lane; generating a set of possible estimates for the location of the edge based on an offset distance; for each estimate of the set of possible estimates, determining a likelihood value indicative of how likely the estimate is to be the location of the edge; selecting a most likely estimate of the set of possible estimates based on the likelihood values; fitting the sensor data points to a model describing a location and shape of the edge; and determining a representation of the edge based on the model.

BRIEF DESCRIPTION OF THE DRAWINGS

FIG. 3B is a pictorial diagram of a system in accordance with aspects of the disclosure.

FIG. 3C is a functional diagram of a system in accordance with aspects of the disclosure.

DETAILED DESCRIPTION

In one aspect of the disclosure, laser scan data including data points may be collected along a roadway using one or more lasers. The data points may describe intensity and location information for the objects from which the laser light was reflected. Using the laser data, an initial estimate for the location of an edge of a lane line bounding a lane may be determined. The initial estimate may be determined based on detailed map information, previous estimates, and/or other methods.

The initial estimate may be used to generate a set of possible estimates for the location of the edge based on an offset distance. For each estimate of the set, a likelihood value indicative of how likely the estimate may be to the location of the edge may be determined. The most likely estimate may be selected based on the likelihood values.

The laser scan data may be then filtered to identify data points within a pre-determined distance of the selected most likely estimate. The filtering may also include using a lane line detection algorithm. The identified data points may be fit to a model describing the location and shape of the edge. A representation of the edge may be then determined based on the model. These steps may be repeated or performed simultaneously to in order to determine representations of other the edges of other lane lines.

Figure 1:
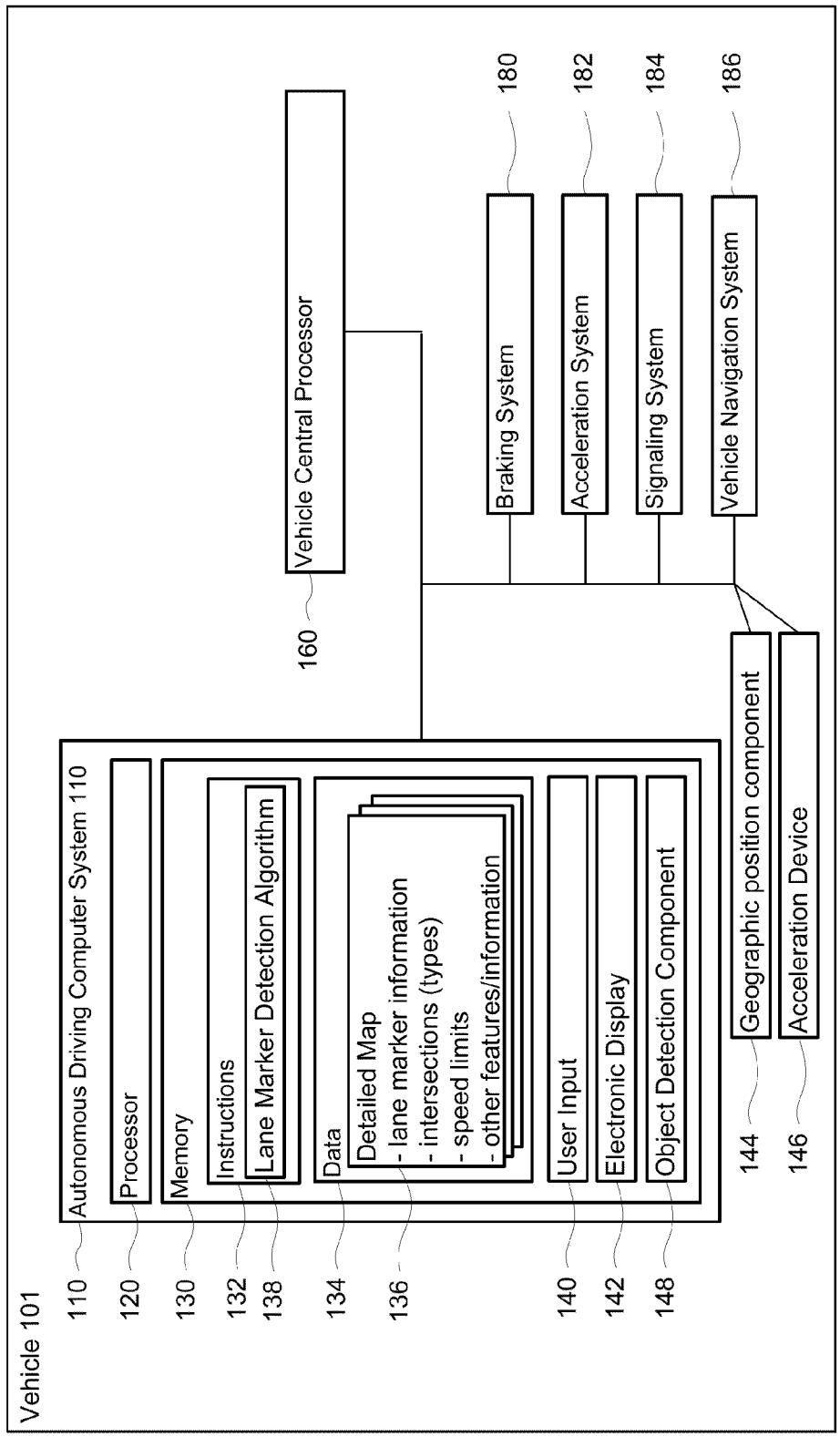
FIG. 1 is a functional diagram of a system in accordance with aspects of the disclosure.

As shown in FIG. 1, an autonomous driving system 100 in accordance with one aspect of the disclosure includes a vehicle 101 with various components. While certain aspects of the disclosure are particularly useful in connection with specific types of vehicles, the vehicle may be any type of vehicle including, but not limited to, cars, trucks, motorcycles, busses, boats, airplanes, helicopters, lawnmowers, recreational vehicles, amusement park vehicles, trams, golf carts, trains, and trolleys. The vehicle may have one or more computers, such as computer 110 containing a processor 120, memory 130 and other components typically present in general purpose computers.

The memory 130 stores information accessible by processor 120, including instructions 132 and data 134 that may be executed or otherwise used by the processor 120. The memory 130 may be of any type capable of storing information accessible by the processor, including a computer-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the system and method is not limited by any particular data structure, the data may be stored in computer registers, in a relational database as a table having a plurality of different fields and records, XML documents or flat files. The data may also be formatted in any computer-readable format. By further way of example only, image data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data may comprise any information sufficient to identify the relevant information, such as numbers, descriptive text, proprietary codes, references to data stored in other areas of the same memory or different memories (including other network locations) or information that is used by a function to calculate the relevant data.

The processor 120 may be any conventional processor, such as commercially available CPUs. Alternatively, the processor may be a dedicated device such as an ASIC. Although FIG. 1 functionally illustrates the processor, memory, and other elements of computer 110 as being within the same block, it will be understood that the processor and memory may actually comprise multiple processors and memories that may or may not be stored within the same physical housing. For example, memory may be a hard drive or other storage media located in a housing different from that of computer 110. Accordingly, references to a processor or computer will be understood to include references to a collection of processors or computers or memories that may or may not operate in parallel. Rather than using a single processor to perform the steps described herein some of the components, such as steering components and deceleration components, may each have their own processor that only performs calculations related to the component's specific function.

In various aspects described herein, the processor may be located remotely from the vehicle and communicate with the vehicle wirelessly. In other aspects, some of the processes described herein are executed on a processor disposed within the vehicle while others are executed by a remote processor, including taking the steps necessary to execute a single maneuver.

Computer 110 may include all of the components normally used in connection with a computer such as a central processing unit (CPU), memory (e.g., RAM and internal hard drives) storing data 134 and instructions such as a web browser, an electronic display 142 (e.g., a monitor having a screen, a small LCD touch-screen or any other electrical device that is operable to display information), user input 140 (e.g., a mouse, keyboard, touch screen and/or microphone), as well as various sensors (e.g., a video camera) for gathering the explicit (e.g., a gesture) or implicit (e.g., "the person is asleep") information about the states and desires of a person.

Figure 2:
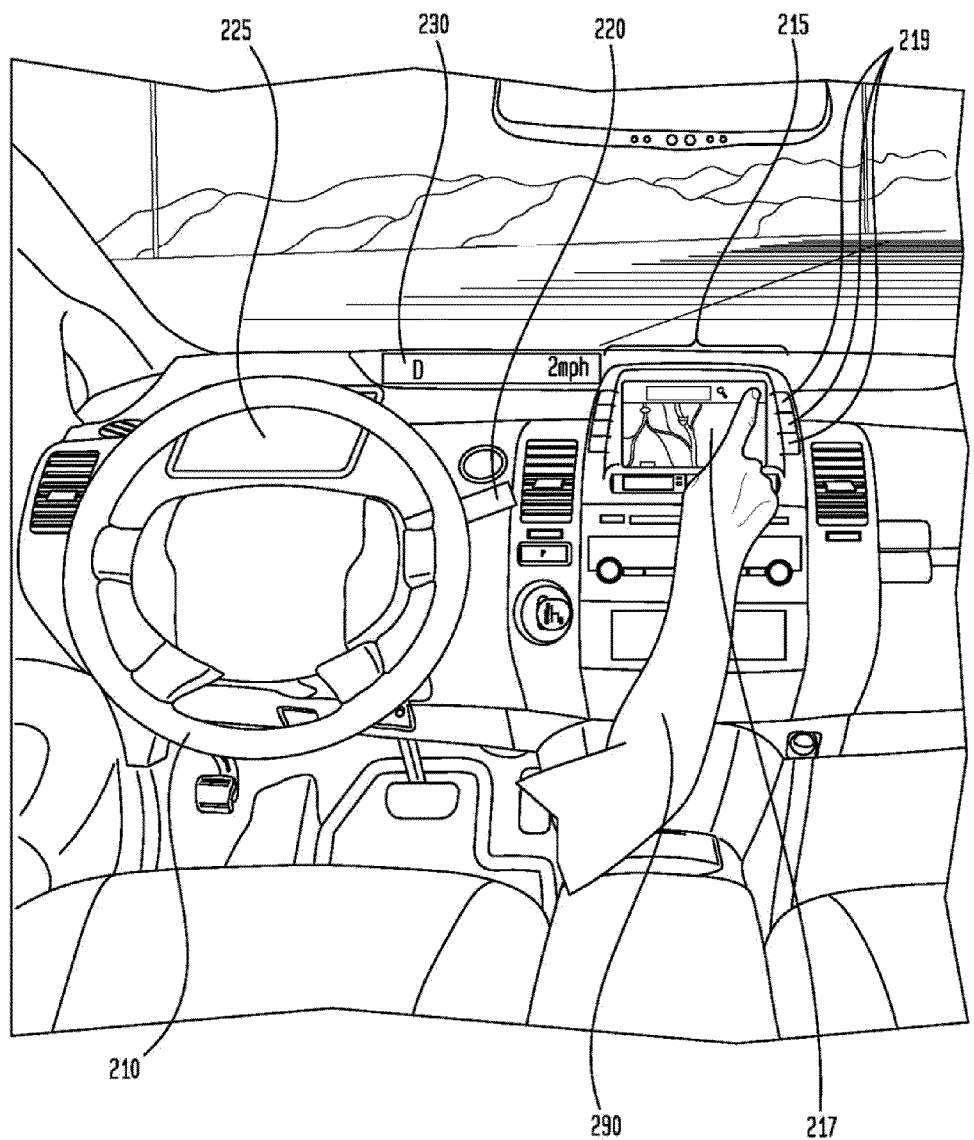
FIG. 2 is an interior of an autonomous vehicle in accordance with aspects of the disclosure.

In one example, computer 110 may be an autonomous driving computing system incorporated into vehicle 101. FIG. 2 depicts an exemplary design of the interior of an autonomous vehicle. The autonomous vehicle may include all of the features of a non-autonomous vehicle, for example: a steering apparatus, such as steering wheel 210; a navigation display apparatus, such as navigation display 215; and a gear selector apparatus, such as gear shifter 220. The vehicle may also have various user input devices, such as gear shifter 220, touch screen 217, or button inputs 219, for activating or deactivating one or more autonomous driving modes and for enabling a driver or passenger 290 to provide information, such as a navigation destination, to the autonomous driving computer 110.

Vehicle 101 may also include one or more additional displays. For example, the vehicle may include a display 225 for displaying information regarding the status of the autonomous vehicle or its computer. In another example, the vehicle may include a status indicating apparatus such as status bar 230, to indicate the current status of vehicle 101. In the example of FIG. 2, status bar 230 displays "D" and "2 mph" indicating that the vehicle is presently in drive mode and is moving at 2 miles per hour. In that regard, the vehicle may display text on an electronic display, illuminate portions of vehicle 101, such as steering wheel 210, or provide various other types of indications.

The autonomous driving computing system may capable of communicating with various components of the vehicle. For example, returning to FIG. 1, computer 110 may be in communication with the vehicle's conventional central processor 160 and may send and receive information from the various systems of vehicle 101, for example the braking 180, acceleration 182, signaling 184, and navigation 186 systems in order to control the movement, speed, etc., of vehicle 101. In addition, when engaged, computer 110 may control some or all of these functions of vehicle 101 and thus be fully or merely partially autonomous. It will be understood that although various systems and computer 110 are shown within vehicle 101, these elements may be external to vehicle 101 or physically separated by large distances.

The vehicle may also include a geographic position component 144 in communication with computer 110 for determining the geographic location of the device. For example, the position component may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise that absolute geographical location.

The vehicle may also include other features in communication with computer 110, such as an accelerometer, gyroscope or another direction/speed detection device 146 to determine the direction and speed of the vehicle or changes thereto. By way of example only, device 146 may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the user, computer 110, other computers and combinations of the foregoing.

The computer may control the direction and speed of the vehicle by controlling various components. By way of example, if the vehicle is operating in a completely autonomous mode, computer 110 may cause the vehicle to accelerate (e.g., by increasing fuel or other energy provided to the engine), decelerate (e.g., by decreasing the fuel supplied to the engine or by applying brakes) and change direction (e.g., by turning the front two wheels).

Figure 3A:
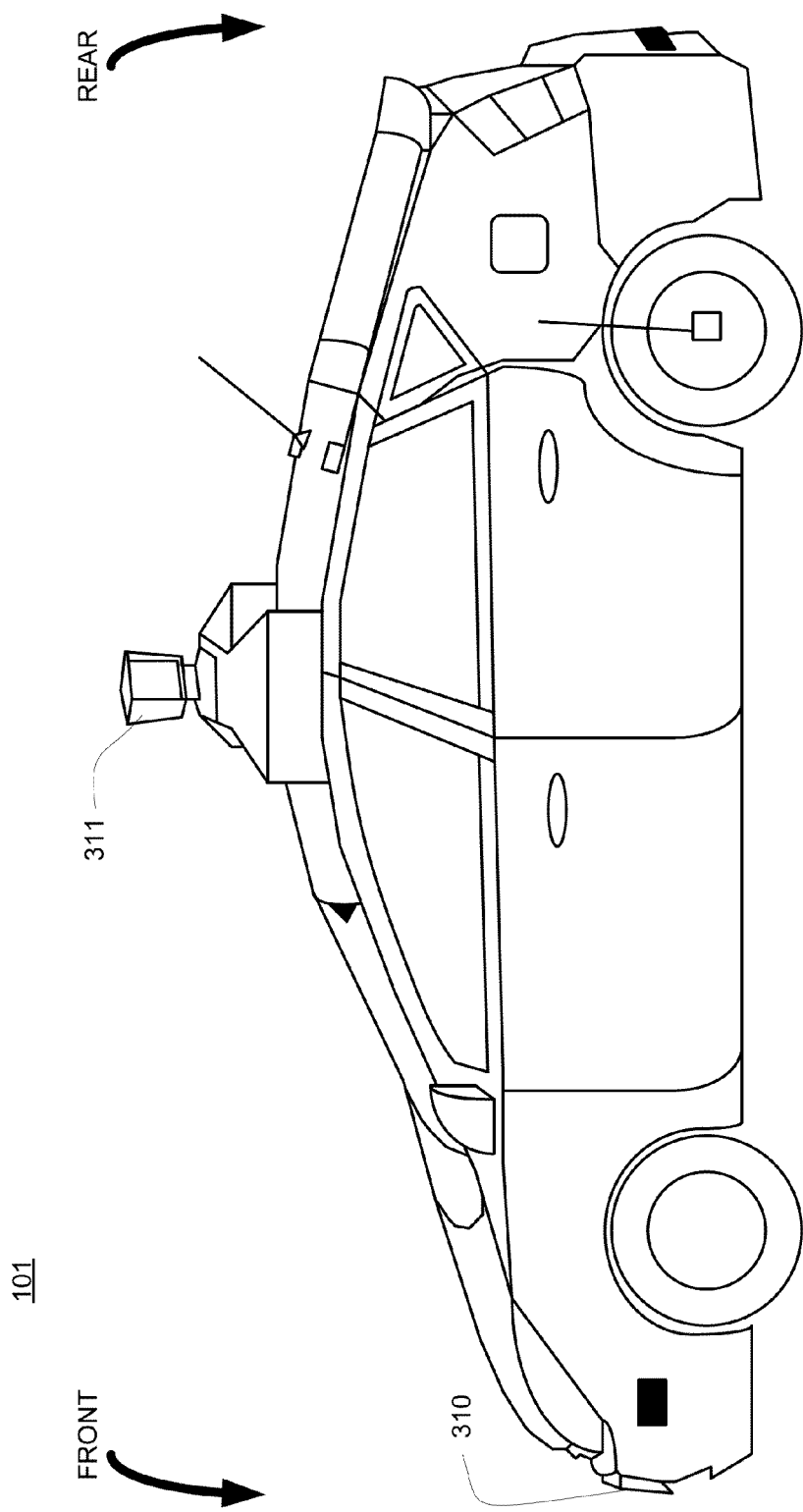
FIG. 3A is an exterior of an autonomous vehicle in accordance with aspects of the disclosure.

The vehicle may also include components for detecting objects external to the vehicle such as other vehicles, obstacles in the roadway, traffic signals, signs, trees, etc. The detection system may include lasers, sonar, radar, cameras or any other detection devices which record data which may be processed by computer 110. For example, if the vehicle is a small passenger vehicle, the car may include a laser mounted on the roof or other convenient location. As shown in FIG. 3A, vehicle 101 may comprise a small passenger vehicle. In this example, vehicle 101 sensors may include lasers 310 and 311, mounted on the front and top of the vehicle, respectively. The lasers may include commercially available lasers such as the Velodyne HDL-64 or other models. The lasers may include more than one laser beam; for example, a Velodyne HDL-64 laser may include 64 beams. In one example, the beams of laser 310 may have a range of 150 meters, a thirty degree vertical field of view, and a thirty degree horizontal field of view. The beams of laser 311 may have a range of 50-80 meters, a thirty degree vertical field of view, and a 360 degree horizontal field of view. It will be understood that other lasers having different ranges and configurations may also be used. The lasers may provide the vehicle with range and intensity information which the computer may use to identify the location and distance of various objects in the vehicles surroundings. In one aspect, the laser may measure the distance between the vehicle and the object surfaces facing the vehicle by spinning on its axis and changing its pitch.

The aforementioned sensors may allow the vehicle to understand and potentially respond to its environment in order to maximize safety for passengers as well as objects or people in the environment. It will be understood that the vehicle types, number and type of sensors, the sensor locations, the sensor fields of view, and the sensors' sensor fields are merely exemplary. Various other configurations may also be utilized.

In addition to the sensors described above, the computer may also use input from sensors typical non-autonomous vehicles. For example, these sensors may include tire pressure sensors, engine temperature sensors, brake heat sensors, brake pad status sensors, tire tread sensors, fuel sensors, oil level and quality sensors, air quality sensors (for detecting temperature, humidity, or particulates in the air), etc.

Many of these sensors provide data that is processed by the computer in real-time, that is, the sensors may continuously update their output to reflect the environment being sensed at or over a range of time, and continuously or as-demanded provide that updated output to the computer so that the computer can determine whether the vehicle's then-current direction or speed should be modified in response to the sensed environment.

In addition to processing data provided by the various sensors, the computer may rely on environmental data that was obtained at a previous point in time and is expected to persist regardless of the vehicle's presence in the environment. For example, returning to FIG. 1, data 134 may include detailed map information 136, e.g., highly detailed maps identifying the shape and elevation of roadways, intersections, crosswalks, speed limits, traffic signals, buildings, signs, real time traffic information, or other such objects and information.

The detailed map information 136 may also include lane marker information identifying the location, elevation, and shape of lane markers. The lane markers may include features such as solid or broken double or single lane lines, solid or broken lane lines, reflectors, etc. A given lane may be associated with left and right lane lines or other lane markers that define the boundary of the lane. Thus, most lanes may be bounded by a left edge of one lane line and a right edge of another lane line.

Figure 4:
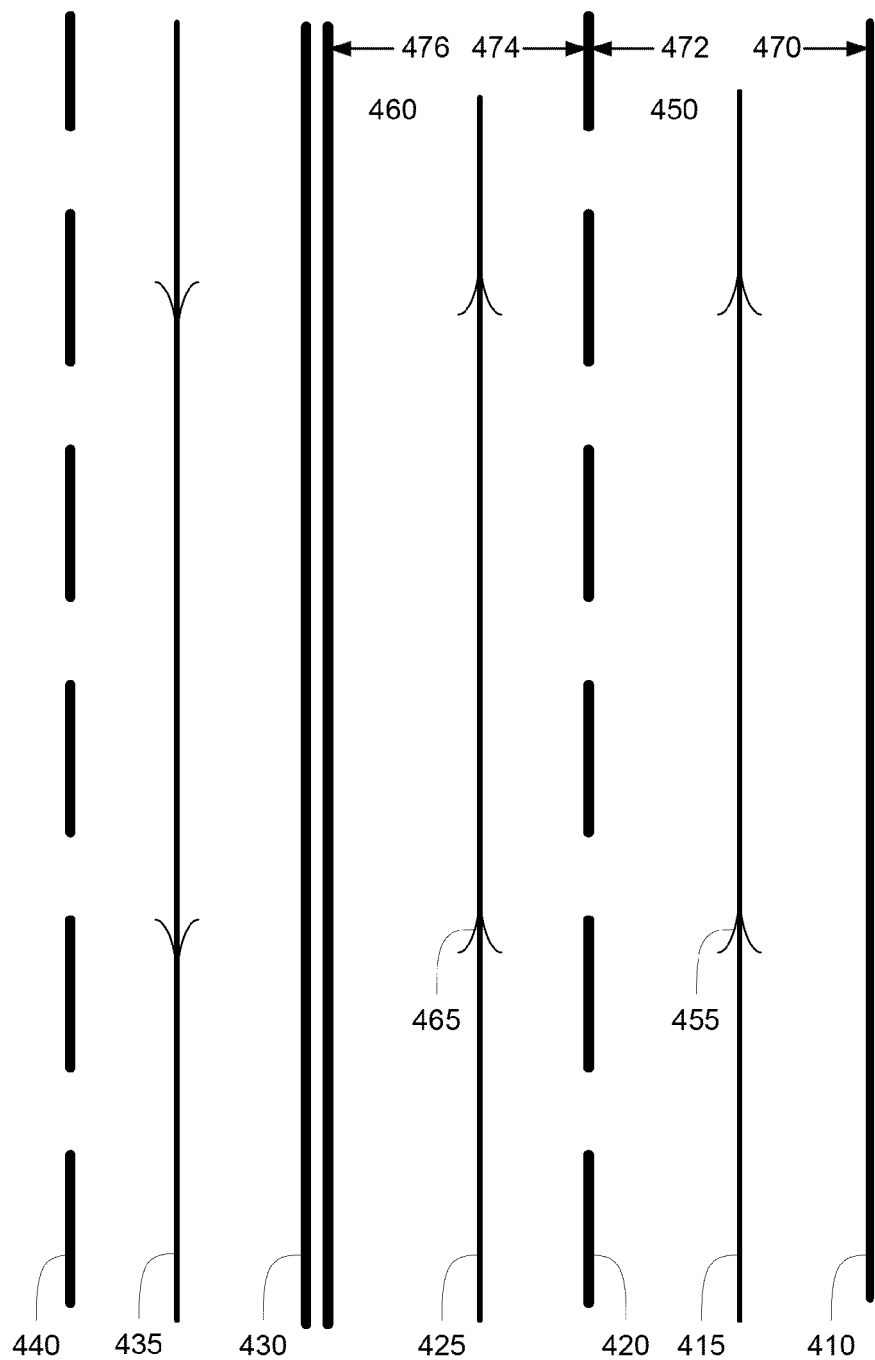
FIG. 4 is a diagram of map information in accordance with aspects of the disclosure.

FIG. 4 depicts a detailed map 400 including the same example section of roadway (as well as information outside of the range of the laser). The detailed map of the section of roadway includes information such as solid lane line 410, broken lane lines 420, 440, and double solid lane lines 430. These lane lines define lanes 450 and 460. Each lane is associated with a rail 455, 465 which indicates the direction in which a vehicle should generally travel in the respective lane. For example, a vehicle may follow rail 465 when driving along lane 460. In this example, lane 450 is bounded by a right lane line 410 and a left lane line 420, and lane 460 is bounded by a right lane line 420 and a left lane line 430. The edges for lane 450 are edges 470, 472 while the edges for lane 460 are edges 474, 476.

Again, although the detailed map information is depicted herein as an image-based map, the map information need not be entirely image based (for example, raster). For example, the detailed map information may include one or more road-graphs or graph networks of information such as roads, lanes, intersections, and the connections between these features. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features.

Computer 110 may also receive or transfer information to and from other computers. For example, the map information stored by computer 110 may be received or transferred from other computers and/or the sensor data collected from the sensors of vehicle 101 may be transferred to another computer for processing as described herein. As shown in FIGS. 3B and 3C, data from computer 110 may be transmitted via a network to computer 320 for further processing. The network, and intervening nodes, may comprise various configurations and protocols including the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computers, such as modems and wireless interfaces. In another example, data may be transferred by storing it on memory which may be accessed by or connected to computers 110 and 320.

In one example, computer 320 may comprise a server having a plurality of computers, e.g., a load balanced server farm, that exchange information with different nodes of a network for the purpose of receiving, processing and transmitting the data from computer 110. The server may be configured similarly to the computer 110, with a processor 330, memory 350, instructions 360, and data 370.

Returning to FIG. 1, instructions 132 may include one or more lane detection algorithms 138. For example, a lane detection algorithm may process laser scan data describing the intensity and location information of objects within range of the laser in order to produce a set of lane marker data points. Each beam of the laser may be associated with a respective subset of data points. For a single beam, the subset of data points may be further divided into sections. For each section, the average intensity and standard deviation may be used to determine a threshold intensity. A set of lane marker data points may be generated by comparing the intensity of each data point to the threshold intensity for the section in which the data point appears and based on the elevation of the data point relative to the roadway surface. This algorithm may also be stored at the vehicle 101, computer 320 or both.

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 5:
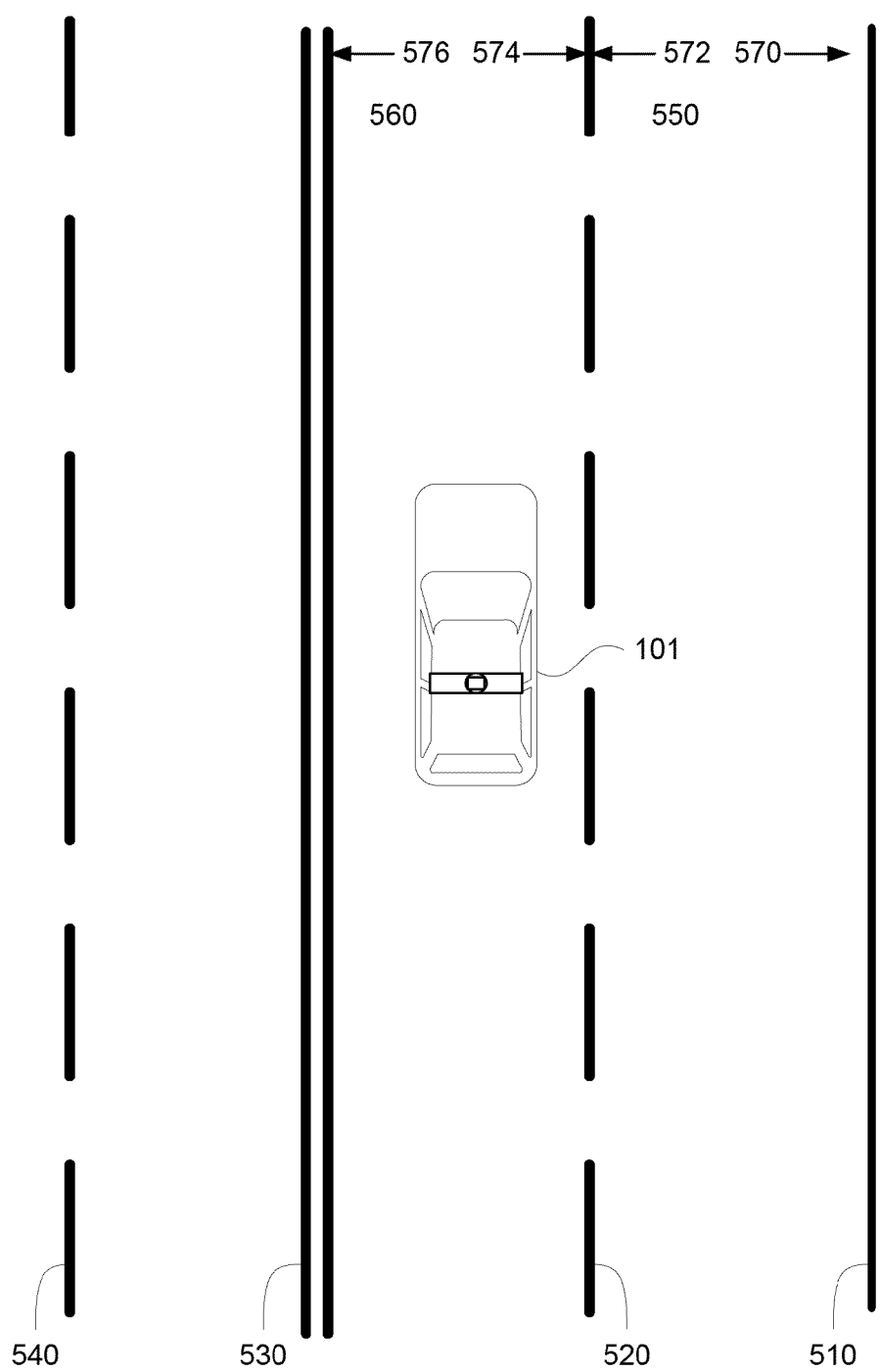
FIG. 5 is a diagram of laser data in accordance with an implementation.

A vehicle including one or more lasers may be driven along a roadway. For example, the laser may be an off board sensor attached to a typical vehicle or a part of an autonomous driving system, such as vehicle 101. FIG. 5 depicts vehicle 101 on a section of the roadway 500 corresponding to the detailed map information of FIG. 4. In this example, the roadway includes solid lane line 510, broken lane lines 520 and 540, double lane lines 530, and lanes 550 and 560.

As the vehicle's laser or lasers are moved along, the vehicle may collect data points including range and intensity information for the same location (point or area) from several directions and/or at different times. For example, each data point may include an intensity value indicative of the reflectivity of the object from which the light was received by the laser as well as location information.

For example, the laser scan data may be processed by computer 110 (or computer 320) to generate geographic location coordinates. These geographic location coordinates may include GPS latitude and longitude coordinates (x,y) with an elevation component (z), or may be associated with other coordinate systems. The result of this processing is a set of data point. Each data point of this set may include an intensity value indicative of the reflectivity of the object from which the light was received by the laser as well as location information: (x,y,z).

Figure 6:
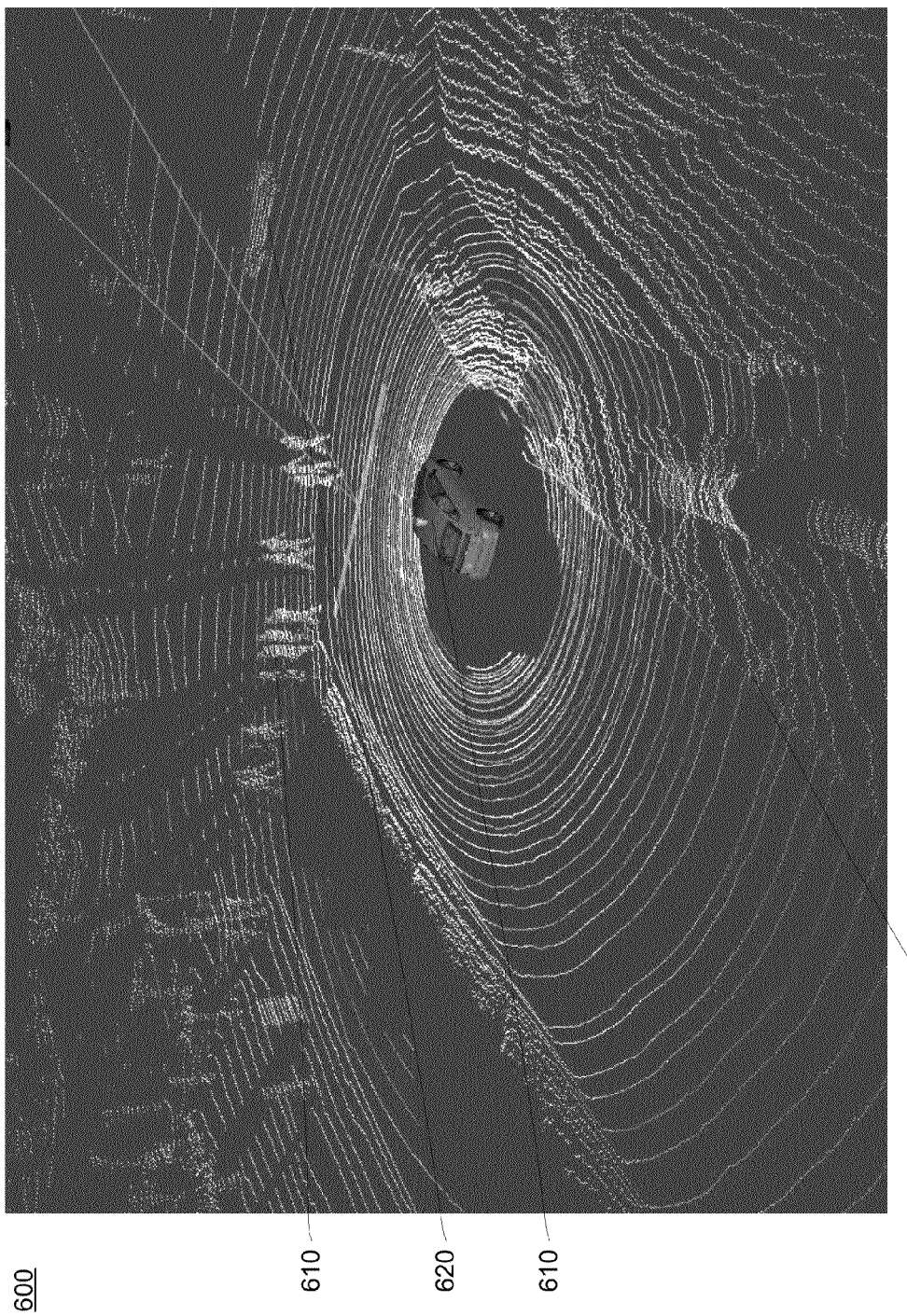
FIG. 6 is another diagram of laser data in accordance with an implementation.

FIG. 6 depicts an exemplary image 600 of vehicle 101 approaching an intersection. The image was generated from laser scan data collected by the vehicle's lasers for a single 360 degree scan of the vehicle's surroundings, for example, using the data points of all of the beams of the collecting laser(s). The white lines represent how the laser "sees" its surroundings. When the data points of a plurality of beams are considered together, the data points may indicate the shape and three-dimensional (3D) location (x,y,z) of other items in the vehicle's surroundings. For example, the laser scan data may indicate the outline, shape and distance from vehicle 101 of various objects such as people 610, vehicles 620, and curb 630.

Figure 7:
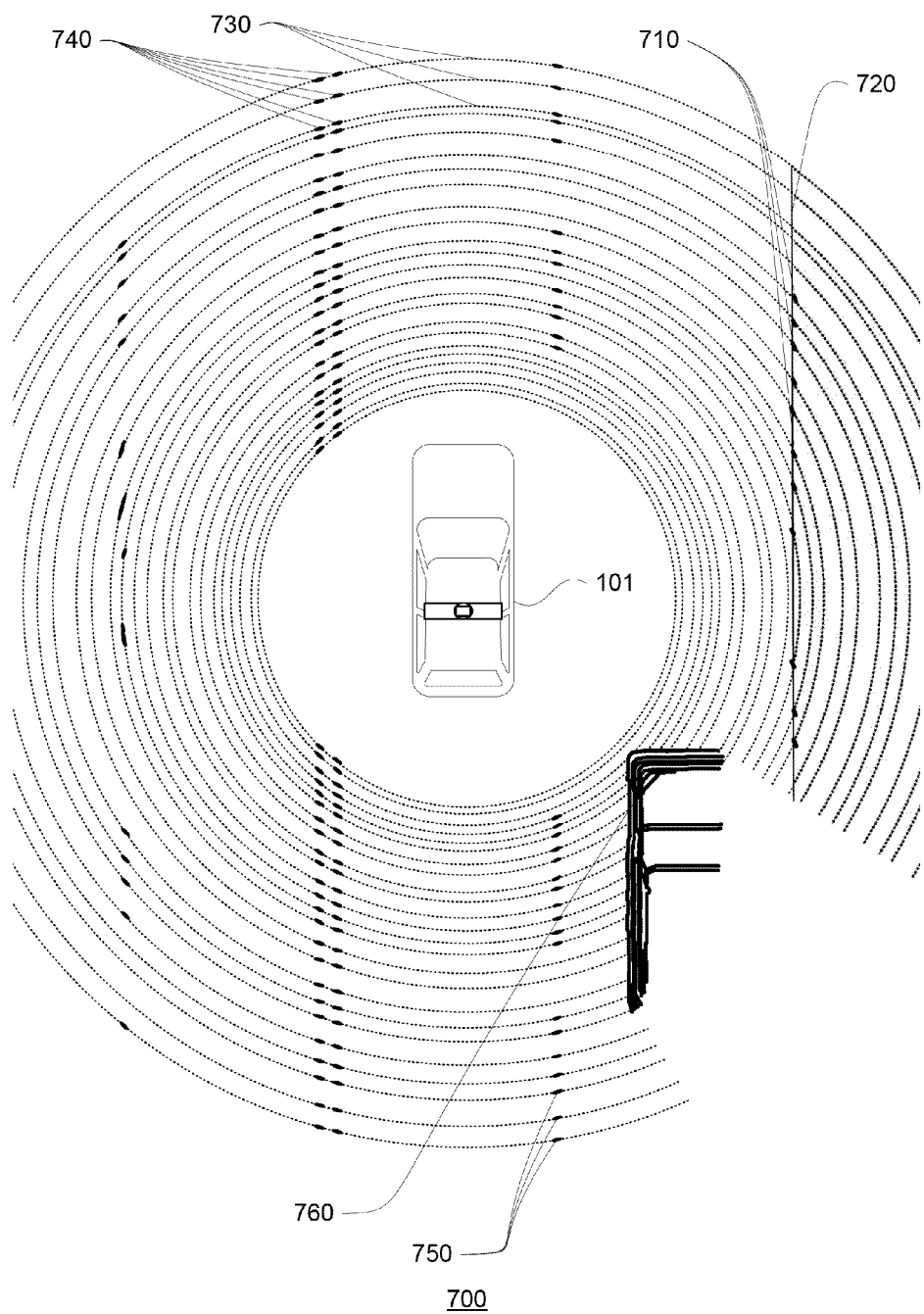
FIG. 7 is a diagram of a roadway in accordance with an implementation.

FIG. 7 depicts another example 700 of laser scan data collected for a single scan while a vehicle is driven along roadway 500 of FIG. 5 (and also that depicted in map information 400 of FIG. 4). In the example of FIG. 7, vehicle 101 is depicted surrounded by laser lines 730 indicating the area around the vehicle scanned by the laser. Each laser line may represent a series of discrete data points from a single beam. Data points from more highly reflective features such as lane lines, white paint, reflectors, or those with retroreflective properties may have a greater intensity than less reflective features. In this example, reference line 720 connects the data points 710 associated with a solid lane line and is not part of the laser data.

FIG. 7 also includes data points 740 generated from light reflecting off of the double lane lines 530 (shown in FIG. 5) as well as distance and data points 750 generated form light reflecting off of the broken lane line 520 (shown in FIG. 5). In addition to features of the roadway 500, the laser scan data of FIG. 7 may include data from other objects such as 760 generated from another object in the roadway, such as a vehicle.

Figure 8:
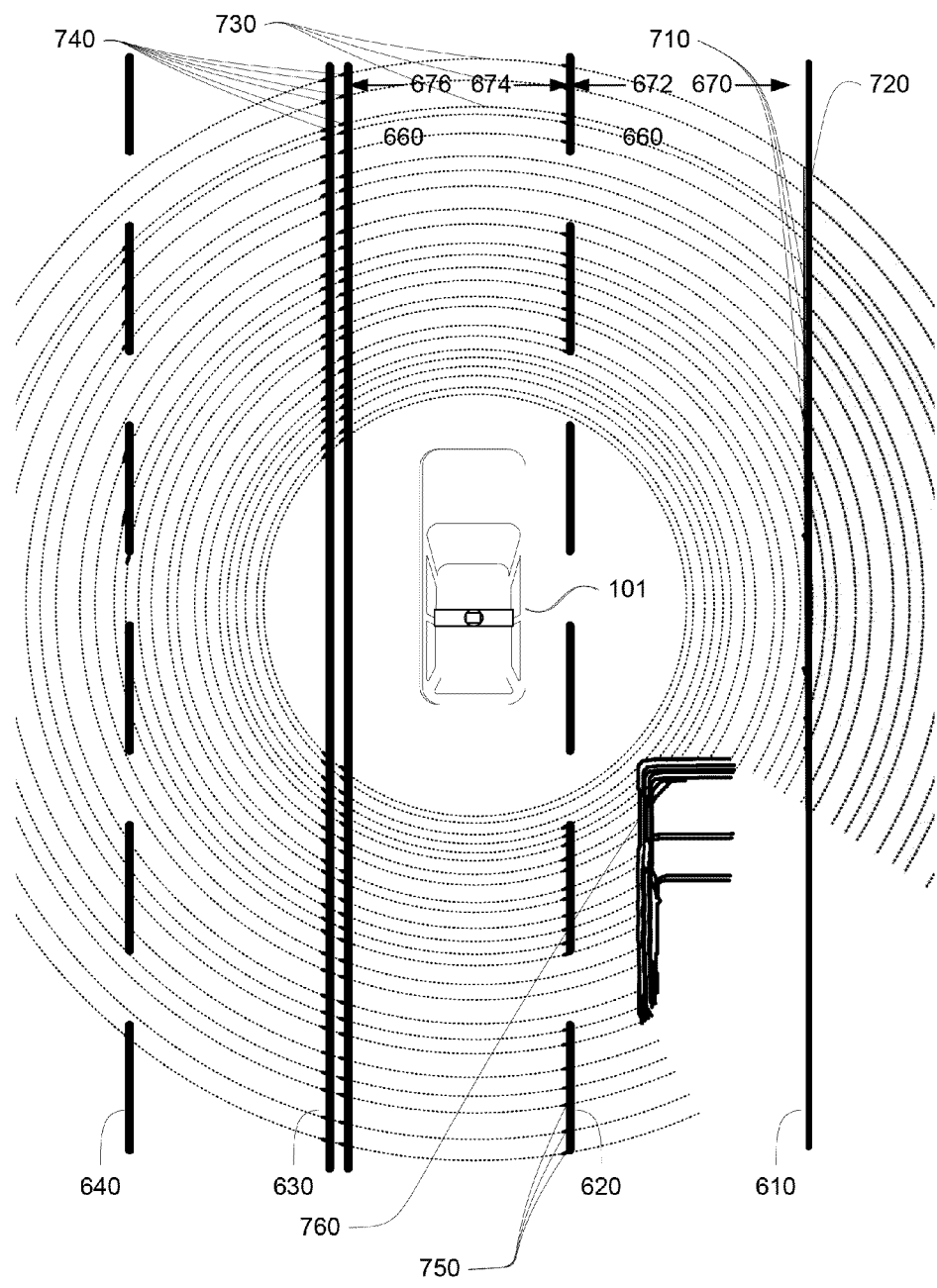
FIG. 8 is a diagram of laser data and map information in accordance with aspects of the disclosure.

FIG. 8 is a comparison 800 of the map 400 of FIG. 4 with the laser scan data of FIG. 7. In this example, data points 740 are associated with double lane lines 730, and data points 750 are associated with lane line 720. However, it can be seen that at least some of the laser scan data does not line up perfectly with the map information 400.

The computer may determine an initial estimate for the location of an edge of a lane lines. For example, returning to FIG. 5, if vehicle 101 is being driven in lane 560, the relevant edges for this lane may be those associated with double lane lines 530 and lane line 520, or edges 574 and 576. Thus, the computer may generate an initial estimate for edge 574 and/or edge 576. The following examples are related to a single edge 574 for a single lane line, though these steps may be repeated for other edges as well. In one example, a previous estimate of the location of the same or a different edge of the same lane line may be used as an initial estimate. In another example, the computer may first cluster the lane marker data points, extract a general shape and use this as an initial estimate. An initial estimate for the lane edges may also be made by observing where vehicles (including the vehicle with the laser or lasers and/or other vehicles) have driven or where they currently are. In this example, the heading of other vehicles may also be used as an initial estimate for the lane direction. An initial estimate may also be randomly generated, for example using a random sample consensus (RANSAC) algorithm.

Figure 9:
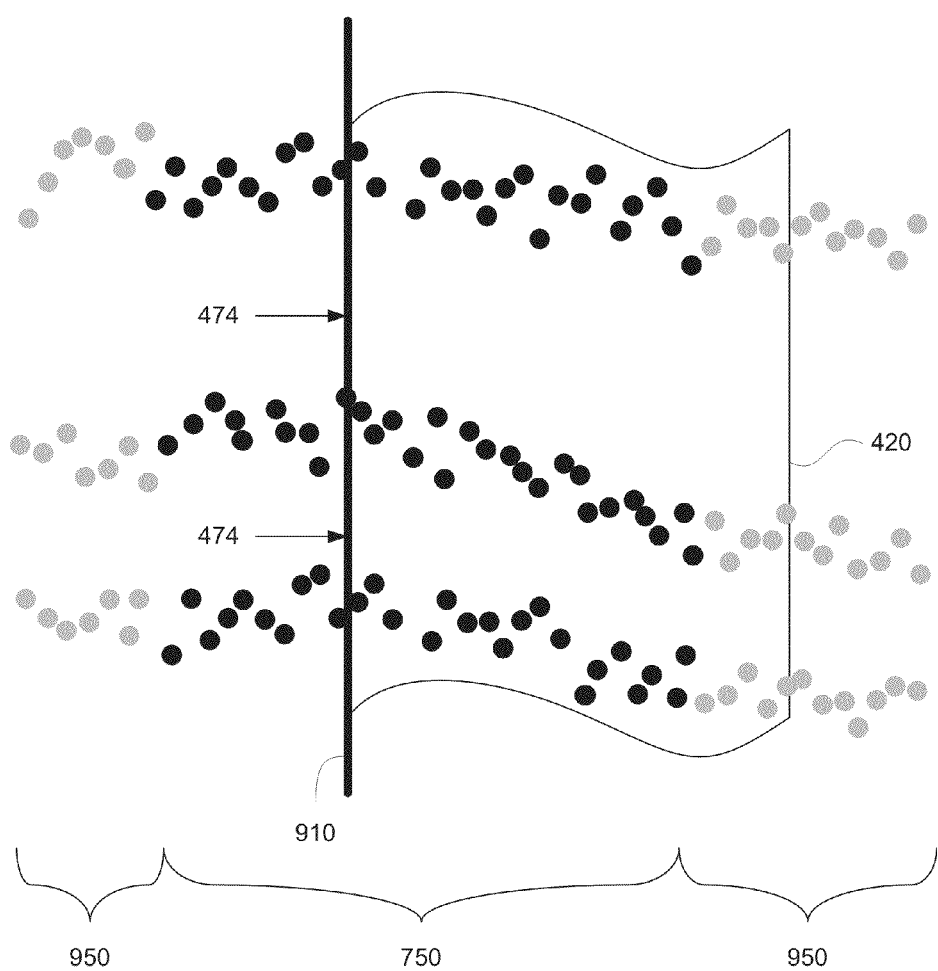
FIG. 9 is another diagram of example laser data and map information in accordance with aspects of the disclosure.

In yet another example, the computer may access the detailed map information and use it to determine an initial estimate. In this example, the pertinent section of the detailed map may be identified based on the location of the vehicle (or laser) when the laser scan data was collected determined from various geographic positioning devices such as the geographic positioning component 144. FIG. 9 is a detailed view of a section of data points 750 and lane line 420. In this example, data points 950 may be associated with a black or darker area of the roadway, while data points 750 may be associated with a lane line. As lane lines are more reflective than a black roadway, data points 950 have a lower intensity value than data points 750 and are thus depicted as grey (rather than black). In this example, the location of edge 474 may be used as an initial estimate 910 for the location of edge 574.

Figure 10:
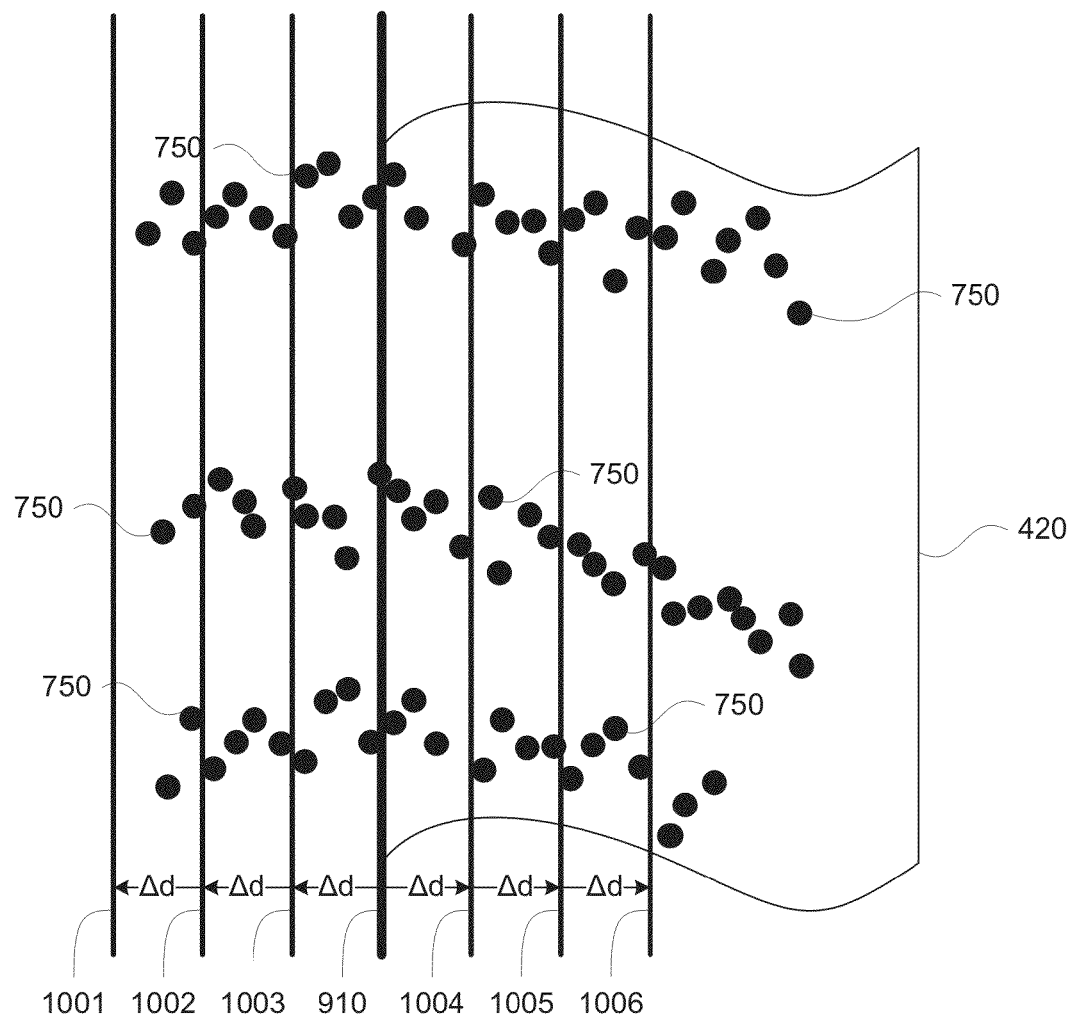
FIG. 10 is a further diagram of example laser data and map information in accordance with aspects of the disclosure.

Using the initial estimate, the computer may generate additional possible estimates. For example, a set of possible locations for an edge of a lane line may be generated by offsetting the initial estimate to the left and to the right (relative to the lane line). The offset may be a relatively small distance, for example, a centimeter or less, and may be repeated in each direction for a much larger distance, for example, 1 meter. FIG. 10 is an example of 6 offsets 1001-1006, 3 to the right and 3 to the left of the initial estimate 910. Each of these offsets is separated by an offset distance of $\Delta d$. The offset distance may be consistent between each of the estimates or it may differ.

Each of particular estimate of the set of estimates may be evaluated to determine how likely the particular estimate is to be the actual lane line edge. Various criteria may be utilized in this determination. For example, if available, a lane line detection algorithm, such as lane detection algorithms 138, may be used to extract lane marker data points or data points that are potentially residing on lane lines. In this example, the criteria may include the total number of lane marker data points within a distance (e.g., on the order of 25 to 40 centimeters), from each estimate of the set and/or the dispersion of the lane marker data points close (e.g., on the order of 25 to 40 centimeters) to the estimate (in particular how well lane marker data point are spread over the entire range of the estimate). The dispersion may be calculated in many ways. For example, the distance between each point in the estimate and some reference point (e.g., the first point in the estimate) could be calculated and the standard deviation of this distance could be used. The higher the standard deviation, the better the spread of the points along the estimate. However, any measure for approximating how well the points are spread out along the estimate would be useful.

The criteria may also include the total number of data points (all data points, and not specifically lane marker data points) within the distance of the estimate, and, if available, the deviation of the estimate from the most recent estimate.

Based on the aforementioned criteria, the computer may select the estimate most likely to be the lane line edge. For example, all or some of the aforementioned criteria may be used to determine a likelihood value for each estimate of the set of estimates. The estimate with the highest likelihood value may be selected as the most likely estimate. The computer may then identify a set of data points by filtering all of the data points or the lane marker data points which are within a distance of the selected estimate. Again the filter may be on the order of 25 to 40 centimeters.

The identified set of data points may be fit to a model describing the location and shape of the edge. For example, the fit may be based on parametric models such linear, cubic, higher-order polynomials, splines, or clothoids, or non-parametric models. The fit may also involve using a least squares method and a quadratic model. In this example, to improve the robustness of the parametric model, an independent variable used for the model may first be aligned with a heading or principle direction for the estimate. For example, for edge 474, the direction of rail 465 (or some small deviation from the direction) for lane 460 may be the direction of the estimate.

In some examples, the model may be post-processed to remove any noisy sections. This may be useful at end points (between broken sections of a lane line or simply the end of a lane line) where there are only few data points have a significant bearing on the solution. The computer may analyze the number points used to calculate a particular part of the estimate (the support) over various sections of the model. This may include comparing the absolute number of data points of the identified set of data points in a given section to the number of data points of the identified set of data points of other second or over the entire model. The analysis may also include evaluating the curvature or smoothness of sections and filtering or smoothing out those sections that appear spurious. For example, some end sections can be removed or other sections can be smoothed so that the sections deviate less from the adjacent sections. In this regard, if an end section of the estimate does not have enough support, it may be removed from the estimate, so that the estimate does not extend as far as it originally did.

The post-processing may also include comparing the model to the previous estimate. For example, the computer may determine how much the previous estimate and the current estimate for a lane edge differ. The computer may allow for some maximum deviation or difference (e.g., it may be unlikely that the lane has completely changed direction). If the current estimate differs more than this maximum, the entire estimate, or any section of the estimate that differs for than the maximum, may be thrown out or ignored.

Although the above examples relate to estimating the location of a single edge of a lane line, the estimate of another edge or other edges may be computed simultaneously or in sequence using the aspects described below. In addition, the aspects above may be applied to the edges of other types of lane markers, such as reflectors. The computer may also calculate all or less than all of the edges proximate to the vehicle (for example within the line of sight of the laser or lasers). This may be useful where the laser scan data is being used to generate map information. If the vehicle is driving autonomously, the computer may estimate locations for all of the edges or only the locations of those edges of the lane in which the vehicle is traveling. For example, returning to FIG. 5, vehicle 101 is driving in lane 560. Thus, computer 110 may estimate a model of the location of edges 574 and 576. The computer may also estimate a model of the locations of other edges such as edges 570 and 572.

The resulting models may then describe the left and right edges of the relevant lane. The models may be used to infer the centerline. The computer may use the centerline in order to maneuver the vehicle. For example, the centerline may be used as a reference position for where the vehicle should be driven.

The models may also be used to extract continuous representations of the edges (for example, along a length of a lane line) or any other type of representation desired (for example, points, line segments, etc). As noted above, the representations may also be used in future determinations, for example, as the initial estimates, to determine the likelihood that an estimate of the location of an edge is the actual edge, or for comparison purposes if the models are post-processed as described above.

Figure 11:
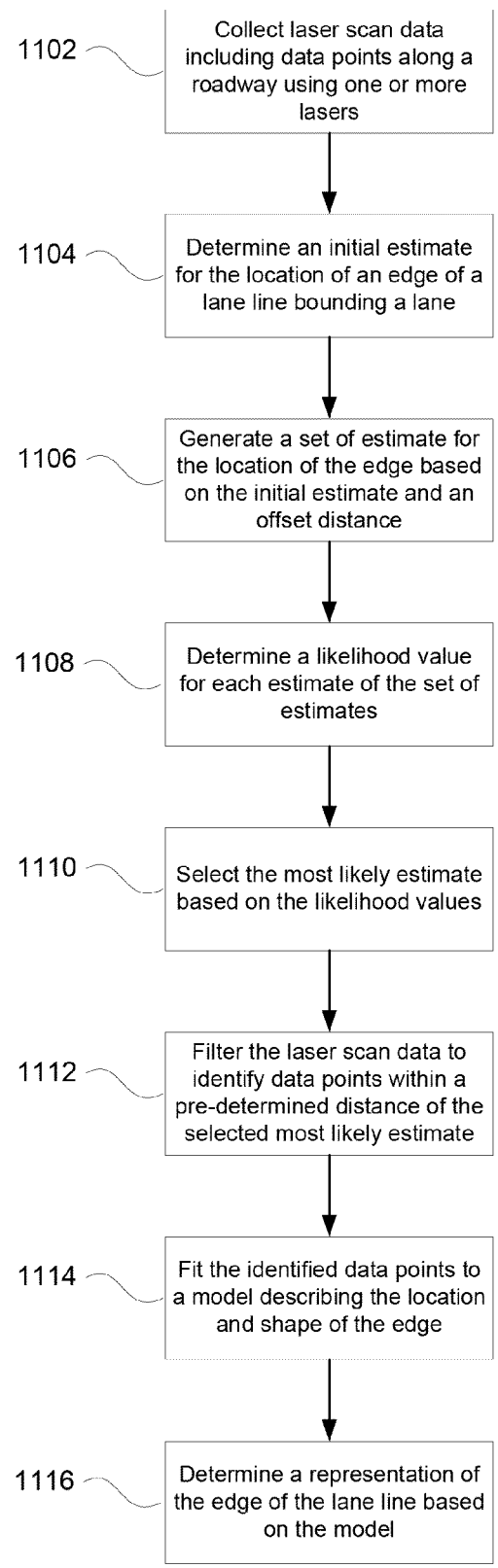
FIG. 11 is a flow diagram in accordance with aspects of the disclosure.

Flow diagram 1100 of FIG. 11 depicts some of the aspects described above. Each of the following steps may be performed by computer 110, computer 320, or a combination of both. In this example, laser scan data including data points is collected along a roadway using one or more lasers or other devices at block 1102. As noted above, the data points may describe intensity and location information for the objects from which the laser light was reflected. Using the laser data, an initial estimate for the location of an edge of a lane line bounding a lane is determined at block 1104. The initial estimate may be determined based on detailed map information, previous estimates, and/or any of the examples described above.

The initial estimate is used to generate a set of possible estimates for the location of the edge based on an offset distance at block 1106. For each estimate of the set, a likelihood value indicative of how likely the estimate is to be the location of the edge is determined at block 1108. The most likely estimate is selected based on the likelihood values at block 1110.

The laser scan data is then filtered to identify data points within a pre-determined distance of the selected most likely estimate at block 1112. The filtering may also include using a lane line detection algorithm. The identified data points are fit to a model describing the location and shape of the edge at block 1114. A representation of the edge is then determined based on the model at block 1116. As described above, these steps may be repeated or performed simultaneously to in order to determine representations of the edges of other lane lines.

The resulting representations can then be used by a computer, such as computer 110, to maneuver an autonomous vehicle, such as vehicle 101, in real time. For example, returning to the example of FIG. 5, the computer 110 may use the representations to keep vehicle 101 in lane 560 between lane lines 520 and 530. As the vehicle moves along the lane, the computer 110 may continue to process the laser data repeating all or some of the steps described above. The models may also be useful for passive or active safety systems in non-autonomous or semi-autonomous vehicles.

In some examples, the edge modeling may be performed at a later time by another computer. For example, the laser scan data may be uploaded or transmitted to computer 320 for processing. The modeling may be performed as described above, and the resulting models may be used to generate, update, or supplement the map information used to maneuver the autonomous vehicles. Similarly, this information may be incorporated into maps used for navigation (for example, GPS navigation) and other purposes.

If a lane line detection algorithm is used, the results need not be 3D (x,y,z) data points. Rather this data may be expressed as line segments, image coordinates, or noisy estimates, and may be used in place of the lane marker data points described above. For example, data from sensors other than a laser may also be analyzed using the concepts discussed above.

The aspects described above may provide additional benefits. For example, by filtering the data points to examine only those relevant to the most likely estimate of an edge before the fitting, the amount of data to be processed and fit to a model may be dramatically reduced. This, in turn, may reduce the processing power cost required to fit the model. If the laser scan data is being processed in real time to identify the location of lane line edges to maneuver an autonomous vehicle, the modeling may be performed every tenth of a second. This is important because the vehicle's computer must be able to make decisions quickly. Thus, the value of the savings in terms of time and processing power cost may be enormous.

As these and other variations and combinations of the features discussed above can be utilized without departing from the subject matter as defined by the claims, the foregoing description of exemplary implementations should be taken by way of illustration rather than by way of limitation of the subject matter as defined by the claims. It will also be understood that the provision of the examples described herein (as well as clauses phrased as "such as," "e.g.", "including" and the like) should not be interpreted as limiting the claimed subject matter to the specific examples; rather, the examples are intended to illustrate only some of many possible aspects.

The invention claimed is:

1. A computer implemented method comprising:
accessing sensor data collected for a roadway, the sensor data including data points having location information for objects;
determining an initial estimate for a location of an edge of a lane marker bounding a lane;
generating a set of possible estimates for the location of the edge based on an offset distance and the initial estimate;
for each estimate of the set of possible estimates, determining a likelihood value indicative of how likely the estimate is to be the location of the edge;
selecting a most likely estimate of the set of possible estimates based on the likelihood values;
fitting, by a processor, the sensor data points to a model describing a location and shape of the edge; and
determining a representation of the edge based on the model.

2. The method of claim 1, wherein determining the initial estimate includes accessing detailed map information for the roadway, and the initial estimate is based on a location of an edge included in the detailed map information.

3. The method of claim 1, wherein determining the initial estimate is based on a previous representation of the location of the edge of the lane marker.

4. The method of claim 1, wherein generating the set of possible estimates for the location of the edge includes moving the initial estimate laterally from the initial estimate the offset distance a plurality of times.

5. The method of claim 1, further comprising using the representation of the edge to maneuver a vehicle autonomously.

6. The method of claim 1, further comprising:
determining an initial estimate for a location of a second edge of a second lane marker bounding the lane;
generating a second set of possible estimates for the location of the second edge based on the offset distance;
for each estimate of the second set of possible estimates, determining a second likelihood value indicative of how likely the estimate is to be the location of the second edge;
selecting a second most likely estimate of the second set of possible estimates based on the likelihood values;
filtering the sensor data to identify second data points within the pre-determined distance of the selected second most likely estimate;
fitting the identified second data points to a second model describing a second location and shape of the second edge; and
determining a second representation of the second edge based on the second model.

7. The method of claim 6, further comprising determining a centerline of the lane based on the representation and the second representation.

8. The method of claim 6, further comprising maneuvering a vehicle autonomously based on the representation and the second representation.

9. The method of claim 1, further comprising receiving the sensor data from a laser device.

10. The method of claim 1, further comprising:
filtering the sensor data to identify data points within a pre-determined distance of the selected most likely estimate;
wherein the sensor data points fit to the model describing the location and shape of the edge are the identified data points.

11. A device comprising:
memory storing sensor data collected for a roadway, the sensor data including data points having location information for objects;
a processor coupled to the memory, the processor being configured to:
determine an initial estimate for a location of an edge of a lane marker bounding a lane;
generate a set of possible estimates for the location of the edge based on an offset distance and the initial estimate;
for each estimate of the set of possible estimates, determine a likelihood value indicative of how likely the estimate is to be the location of the edge;
select a most likely estimate of the set of possible estimates based on the likelihood values;
fit the sensor data points to a model describing a location and shape of the edge; and
determine a representation of the edge based on the model.

12. The device of claim 11, wherein the processor is configured to determine the initial estimate by accessing detailed map information for the roadway, and the initial estimate is based on a location of an edge included in the detailed map information.

13. The device of claim 11, wherein the processor is configured to determine the initial estimate based on a previous representation of the location of the edge of the lane marker.

14. The device of claim 11, wherein the processor is configured to generate the set of possible estimates for the location of the edge by moving the initial estimate laterally from the initial estimate the offset distance a plurality of times.

15. The device of claim 11, wherein the processor is configured to use the representation of the edge to maneuver a vehicle autonomously.

16. The device of claim 11, wherein the processor is further configured to determine an initial estimate for a location of a second edge of a second lane marker bounding the lane;
   generate a second set of possible estimates for the location of the second edge based on the offset distance;
   for each estimate of the second set of possible estimates, determine a second likelihood value indicative of how likely the estimate is to be the location of the second edge;
   select a second most likely estimate of the second set of possible estimates based on the likelihood values;
   filter the sensor data to identify second data points within the pre-determined distance of the selected second most likely estimate;
   fit the identified second data points to a second model describing a second location and shape of the second edge; and
   determine a second representation of the second edge based on the second model.

17. The device of claim 16, wherein the processor is further configured to:
   determine a centerline of the lane based on the representation and the second representation; and
   maneuver a vehicle along the centerline.

18. The device of claim 16, wherein the processor is further configured to maneuver a vehicle autonomously based on the representation and the second representation.

19. The device of claim 11, wherein the processor is further configured to receive the sensor data from a laser device.

20. The device of claim 11, wherein the processor is further configured to:
   filter the sensor data to identify data points within a pre-determined distance of the selected most likely estimate;
   wherein the data points fit to the model describing the location and shape of the edge are the identified data points.

21. A tangible computer-readable storage medium on which computer readable instructions of a program are stored, the instructions, when executed by a processor, cause the processor to perform a method, the method comprising:
   accessing sensor data collected for a roadway, the sensor data including data points having location information for objects;
   determining an initial estimate for a location of an edge of a lane marker bounding a lane;
   generating a set of possible estimates for the location of the edge based on an offset distance and the initial estimate;
   for each estimate of the set of possible estimates, determining a likelihood value indicative of how likely the estimate is to be the location of the edge;
   selecting a most likely estimate of the set of possible estimates based on the likelihood values;
   fitting the sensor data points to a model describing a location and shape of the edge; and
   determining a representation of the edge based on the model.

* * * * *